3,240,557
SELECTIVE CHLORINATION WITH ELEMENTAL CHLORINE OF ORES CONTAINING HIGH MELTING METALS
Bernard J. Lerner, O'Hara Township, Allegheny County, Pa., assignor to Dominion Gulf Company, Pittsburgh, Pa., a corporation of Pennsylvania
No Drawing. Filed Mar. 22, 1962, Ser. No. 181,774
10 Claims. (Cl. 23—16)

This invention relates to an extractive metallurgical process for recovering high melting metals such as columbium or the like from materials containing the same and more particularly to the recovery of columbium values or equivalent metal values from ores or concentrates containing the same by chlorination at moderate temperature conditions.

The recovery of columbium and other high melting metals that form low boiling chlorides can be effected at feasible reaction rates by reductive chlorination of ores or concentrates containing the desired metal values with elemental chlorine in the presence of a reducing agent such as carbon and at temperatures of the order of 1000° C. or more. However, this procedure is not entirely satisfactory as the high reaction temperatures employed are conducive to undue consumption of chlorine in the chlorination of unwanted materials and to excessive corrosion of equipment, and the use of lower temperatures ordinarily results in unsatisfactory columbium extraction. Columbium metal values and other equivalent metal values can also be recovered at moderate temperatures by the use of carbon-containing chlorinating reagents such as carbon tetrachloride. Although the indicated low temperature procedure is satisfactory from the standpoint of equipment corrosion and chlorine loss by chlorination of unwanted materials, it suffers a comparative disadvantage in that it requires the use of a relatively high cost chlorination reagent.

The present invention relates to an extractive metallurgical process for extracting columbium values or other high melting metals that form low boiling chlorides from materials containing the same, wherein equipment corrosion problems, chlorination reagent cost and consumption of chlorine through chlorination of unwanted materials are maintained at relatively low levels. It has now been found that extraction of high melting metals of the kind indicated from ores or ore concentrates with chlorine at relatively low temperatures is greatly facilitated by the use of a chlorination promoter comprising a sulfide of a metal that has a variable valence and that is capable of forming a chloride that is nonvolatile in at least one of its valence states under the chlorination conditions employed. In accordance with this invention, chlorination of the high melting metal content of an ore or concentrate is brought about by effecting intimate contact between elemental chlorine and such ore or concentrate in finely divided form, preferably in the form of a fluidized bed, in admixture with about 1 to 10 percent by weight, preferably 2 to 6 percent, of a sulfide of a metal of the class indicated above. A specific example of a preferred metal sulfide is iron pyrite, but other metal sulfides can be used. Examples of other metal sulfides that can be used are tin and lead sulfides. The temperature employed in the chlorination reaction should be effective to form a vaporous chloride of the desired high melting metal but insufficient to chlorinate substantial proportions of the unwanted components of the high melting metal-containing material. Chlorination temperatures in the range of about 315° C. to 400° C. are preferred, but greater or lesser temperatures, for example in the range of about 240° C. to 450° C. can be used. During chlorination, vaporous constituents are removed from the reaction mixture and the chloride of the desired high melting metal is recovered from the reaction off-gases.

The exact mechanism by which the metal sulfides defined herein function to promote relatively selective chlorination of the desired high melting metal at comparatively low temperatures is not fully understood. However, available experimental evidence points to the fact that both the metal and the sulfur take an active part in the reaction mechanism. Thus, a metal sulfide of the class indicated was found to be markedly superior to the oxide of the same metal for purposes of chlorination of a columbium pyrochlore ore. By the same token, sulfur in the form of a metal sulfide of the class indicated was found to be markedly superior to elemental sulfur in the chlorination of a columbium pyrochlore ore.

Any sulfide of a metal having a variable valence and that is capable of forming in at least one of its valence states a chloride that is nonvolatile at the chlorination reaction conditions can be used provided such sulfide is effective to promote chlorination of the columbium values or other desired high melting components in an ore concentrate containing the same at the relatively moderate temperature disclosed herein. Especially effective results are obtainable with sulfides of iron group metals such as iron pyrite, $FeS_2$. Examples of other iron group metal sulfides include ferric and ferrous sulfides as well as cobalt and nickel sulfides. Examples of sulfides of other metals of variable valence included by the present invention are tin and lead sulfides, but other metal sulfides can be used.

The herein-disclosed process has been found highly effective for use in connection with low-grade columbium pyrochlore ores, which are distinguished by their oxygen- and fluorine-containing composition, by the difficulty with which they can be concentrated or beneficiated, and more particularly for purposes of this invention, by the fact that they are chemically nonrefractory. Pyrochlore ore concentrates can also be used. The partial analysis of one sample of a columbium pyrochlore ore of the kind to which the present process is applicable was as follows:

| | Percent |
|---|---|
| Calcium carbonate | 9.5 |
| Iron | 11.82 |
| Fluorine | 0.10 |
| Columbium | 0.32 |

Other materials found to be present in appreciable amounts by analysis of both unvaporized chlorination tailings and vaporized chlorination products are Al, Si, Na, and in trace amounts, Mg, Ti, Mn, K, Zr, Ba, and Cu. The raw ore was a pyroxenitic ore containing large amounts of acmite and aegirite type minerals, with minor amounts of feldspar, wollastonite, biotite, quartz, and apatite as gangue materials, together with a small amount of pyrochlore. As previously indicated, the process also is considered useful in connection with other high melting point metal-containing materials such as columbite ores and concentrates, especially ores or concentrates of metals of Groups IV and V of the Periodic Table of Mendelyeev that form low-boiling chlorides. A specific example of such a metal is tantalum. Examples of other high melting metals that form low-boiling chlorides or oxychlorides are titanium, vanadium, chromium, zirconium, molybdenum, tungsten, and antimony. Contrary to what might be expected, the presence of predominant proportions of gangue materials relative to the desired metal is not harmful, as the process is essentially selective for metals that form low-boiling chlorides. In fact, the presence of the gangue materials may be beneficial.

Satisfactory columbium recovery can be obtained at chlorination temperatures as low as about 240° C., the boiling point of columbium pentachloride, but temperatures at least as great as the boiling point of ferric chloride, about 315° C., are preferred when the ore or concentrate contains iron and/or when the chlorination promoting agent is an iron sulfide, so as to avoid agglomeration of ore particles by molten ferric chloride. Somewhat higher temperatures, for example, up to about 450° C. or more, can be employed, but chlorination selectivity declines with increasing temperature. Accordingly, when the temperature of the chlorination reaction is too high, undue losses of chlorine through chlorination of unwanted materials will be encountered, and a heavier load may be placed upon the product purification facilities. Within the disclosed range of chlorination temperatures extraction of the desired high melting metal will be greater than that ordinarily obtainable at the same temperatures when no metal sulfide chlorination promoter is employed, other conditions being equal. Stated another way, the chlorination temperatures disclosed herein are lower than those ordinarily required to obtain comparable extraction of high melting metal in the absence of a metal sulfide promoter, other factors being equal.

The chlorination reaction can be carried out satisfactorily at ambient atmospheric pressures or at pressures slightly in excess thereof such as are normally encountered in fluidized solids reaction systems, but greater or lesser pressures can be advantageous, for example, to increase the volatility of the desired metal chloride or to decrease the volatility of the chloride derived from the metal sulfide reaction promoter, at a given reaction temperature.

The chlorination reaction is considered to take place rapidly, particularly when the ore or concentrate has been previously activated by oxygen treatment at moderately elevated temperatures, as disclosed in my copending application, Serial No. 175,841, filed February 26, 1962. Thus, under the preferred chlorination conditions, there is reason to believe that a reaction time as little as a few minutes in duration may be all that is involved. However, as a practical matter, when dealing with large masses of ore, longer times of contact may be desirable to insure thorough contact between the chlorine and the particles containing the desired metal values. When operating with a fluidized bed of ore or concentrate at chlorinating temperatures of about 350° C., good extraction of the desired metal values is obtainable with average residence times for the ore, that is, reaction times, of about 20 to 45 minutes, although longer or shorter reaction times can be used.

The amount of elemental chlorine employed should of course be sufficient to chlorinate all of the columbium or other metal values to be recovered from the ore. The absolute amount required for this purpose will of course vary with the columbium content of the ore and to some extent with the reaction conditions selected. In order to allow for chlorine losses and less than 100 percent chlorine utilization, I prefer to employ chlorine in an amount at least about three and preferably about 7 to 25 times the stoichiometric amount required to react with the columbium or other desired metal values present in the ore. Thus, where the columbium content of an ore is about 0.6 percent, calculated as columbium oxide, good columbium extraction will be obtained by the use of chlorine in amounts of about 5.5 to 20 pounds or more per 100 pounds of ore. Not all of the chlorine supplied to the reactor need be fresh chlorine, and part can be supplied by recycling unreacted chlorine recovered from the reaction off-gases.

Inasmuch as the chlorination reaction described herein involves a chemical reaction, contact between the ore or concentrate, the metal sulfide reaction promoter, and the chlorine should be intimate. To this end, the ore or concentrate and the metal sulfide promoter should be in finely divided form, so as to insure a large surface area. Suitable particle sizes are those within the fluidizable solids range, that is, such as to permit fluidization at superficial linear fluidizing gas velocities in the range of about 0.03 to 1.5 feet per second, preferably 0.5 to 1 foot per second, as will be the case, for example, when the ore is ground to a size sufficiently small to pass a 65-mesh screen. A typical example of a columbium pyrochlore ore of the kind described herein that was found to produce good columbium extraction in accordance with the present process, when ground to pass a 65-mesh screen had the following size distribution:

| | Percent |
|---|---|
| +65 mesh | 1.47 |
| −65, +100 mesh | 3.82 |
| −100, +150 mesh | 10.86 |
| −150, +200 mesh | 12.62 |
| −200, +325 mesh | 22.21 |
| −325 mesh | 49.02 |

However, depending upon the density of the ore or concentrate other particle size distributions in the range of about −50 to +400 mesh can be used.

In order to facilitate good columbium recovery at the relatively moderate temperatures disposed herein, it is preferred that the ores to be processed be subjected to a preliminary activation treatment, prior to chlorination, in the manner disclosed in my copending application Serial No. 175,841, referred to above. Briefly, such activation involves intimately contacting the ore in finely divided form, ordinarily in a fluidized bed, with oxygen, either as such or in the form of a mixture such as air, at an elevated temperature, typically in the range of about 200° C. to about 500° C., preferably about 300° C. to 450° C., in a ratio ordinarily in the range of about 0.017 pound or more, preferably about 6.1 pounds or more, of oxygen per pound of ore, and for a time, usually in the range of about 20 minutes to 12 hours, effective to increase the susceptibility of the ore to chlorination under the conditions disclosed herein.

Moisture in the ore, both adsorbed and chemically combined, is preferably reduced to a small amount before treatment in accordance with the hereindisclosed process, as its presence results in hydrolysis of the chlorinated metal to oxychloride, which, in the case of columbium, is a harmful impurity. Unless steps are taken to separate the oxychloride and/or to convert it into the corresponding chloride, it may tend to introduce oxygen into the final purified metal, whereby the properties of such metal itself are adversely affected. The moisture content of the ore is preferably maintained in the range of about 0 to 0.2 percent, but somewhat higher moisture content, say up to about 0.4 percent, can be tolerated, without undue losses of columbium to oxychloride. Normally, the moisture content of the ore will not be a serious problem, as the oxygen activation pretreatment described herein will be effective incidentally to reduce the moisture content to the preferred range.

Separation of gaseous metal chlorides from the reaction off-gases, purification of the resulting metal chlorides, and conversion of the desired metal chloride to the pure metal can be effected in any convenient way, as these steps as such do not go to the essence of the herein-described invention. Thus, for example, crude metal halides can be conveniently separated from reaction off-gases by fractional condensation. The condensed metal chlorides can then be further purified as desired. Thus, while the process as defined herein is essentially selective for the high melting metals in the ore that form low-boiling chlorides in the sense that only a small percent of the ore is chlorinated and volatilized, some impurities, notably ferric chloride, may be present in the volatilized reaction off-gases. This material is conveniently removed from the metal chloride gas stream by a passage through a salt bed. The ferric chloride can then be removed from the salt bed in the form of a low-melting eutectic solution. The desired metal chloride can ordinarily be separated from any other metal chlorides that may be present by fractional condensation, or by other means. The desired metal can then be recovered from the chloride form by reduction with hydrogen. Unreacted chlorinating agents can be removed from the residual gases by established techniques, such as absorption and stripping combinations, condensation, or the like.

In order to demonstrate the effect on columbium extraction of the herein-disclosed metal sulfide chlorination reaction promoters, comparative experimental runs were carried out both in the presence and absence of a metal sulfide promoter. In these experiments, separate one kilogram samples of a raw pyrochlore ore having a columbium content of 0.57 to 0.60 percent by weight, calculated as $Cb_2O_5$, a calcite content of approximately 9 percent by weight—the balance being substantially all other gangue materials, principally sodium iron silicates—were ground to pass a 65-mesh screen and independently charged to a 7.5 cm. diameter stainless steel, fixed fluid bed reactor, where they were subjected to a preliminary activation treatment involving fluidization with air at the rate of 2 liters per minute for about one hour at 350° C. In runs where a chlorination promoter was added to the ore, the reactor was cooled following the activation treatment, and thereafter the reactor was opened and iron pyrite ($FeS_2$) in the amount of 52 grams was added to the ore. In these instances the reactor was then again brought up to a temperature of 350° C. in about 20 minutes. Following the above-described activating pretreatment, chlorination was effected by introducing elemental chlorine into the reaction bed at the rate of six grams per minute for varying periods of time, depending on the chlorine throughput desired, while maintaining the reaction temperature at about 350° C. Off-gases from the reaction were cooled and conducted to an air-cooled condenser, where columbium pentachloride, together with any metal chloride, such as ferric chloride, were recovered by condensation. The results of these comparative runs are presented in the following table.

*Table*

| Run No. | Through-put, Lb. $Cl_2$/Lb. Ore | Reaction Promoter | | Heads $Cb_2O_5$ Content, Percent | Tails $Cb_2O_5$ Content, Percent | Cb Extraction, Percent | Product | |
|---|---|---|---|---|---|---|---|---|
| | | Metal Sulfide | Wt. Percent | | | | Percent Cb | Percent Fe |
| 1 | 0.08 | | | 0.60 | 0.57 | 5 | | |
| 2 | 0.15 | | | 0.60 | 0.58 | 3.3 | | |
| 3 | 0.20 | | | 0.60 | 0.54 | 10 | | |
| 4 | 0.08 | $FeS^2$ | 5.2 | 0.57 | ¹ 0.11 | ¹ 80.5 | ¹ 52 | ¹ 46 |
| 5 | 0.15 | $FeS^2$ | 5.2 | 0.57 | ¹ 0.045 | ¹ 92 | ¹ 15.5 | ¹ 81.5 |
| 6 | 0.20 | $FeS^2$ | 5.2 | 0.57 | ¹ 0.055 | ¹ 90.5 | ¹ 14 | ¹ 84.5 |

¹ Average of 2 runs.

Comparison of the results obtained in Runs 4, 5, and 6 with those obtained in Runs 1, 2, and 3 indicates that a marked improvement in percent columbium extraction is obtainable at relatively low chlorination temperatures when a metal sulfide reaction promoter of the kind described herein is employed.

Good results can also be obtained by substitution in the preceding embodiment of other ores or concentrates containing high melting point metals that form low boiling chlorides, of the kind disclosed herein, and by the substitution of other equivalent chlorination promoters of the kind disclosed herein. Similarly, good results will also be obtained by varying the process conditions in the manner and within the limits disclosed herein.

Numerous other modifications and variations of the invention as described herein will suggest themselves to those skilled in the art and such modifications and variations can be resorted to without departing from the spirit and scope of the hereindescribed invention. Accordingly, the invention is not to be limited by the embodiments disclosed herein but only by the scope of the claims appended hereto.

I claim:
1. An extractive metallurgical process for recovering in chloride form a high melting metal selected from the group consisting of columbium, tantalum, titanium, vanadium, chromium, zirconium, molybdenum, tungsten and antimony, and that forms a low boiling chloride from an ore containing such metal and that contains predominant proportions of gangue materials, comprising forming a vaporous chloride of said metal by effecting intimate contact between elemental chlorine and a fluidized bed of said ore in finely divided form having added thereto about 1 to 10 percent by weight of a sulfide of a metal selected from the group consisting of iron, cobalt, nickel, tin and lead, that has a variable valence and that is capable of forming a chloride that is nonvolatile at the temperature of the reaction, said chlorine and said ore being contacted in a ratio of about 5.5 to 20 pounds of chlorine per 100 pounds of ore, said contacting being effected at a temperature in the range of about 240° C. to 450° C. and that is effective to form a vaporous chloride of said high melting metal but insufficient to chlorinate a substantial proportion of the gangue materials, removing vaporous constituents from the reaction mixture and recovering the high melting metal chloride therefrom.

2. The process of claim 1 where said high melting metal is columbium.

3. The process of claim 1 where said sulfide is an iron sulfide.

4. The process of claim 1 where said sulfide is iron pyrite.

5. An extractive metallurgical process for recovering in chloride form a high melting metal selected from the group consisting of columbium, tantalum, titanium, vanadium, chromium, zirconium, molybdenum, tungsten and antimony, and that forms a low boiling chloride from an ore containing such metal and that contains predominant proportions of gangue materials, comprising forming a vaporous chloride of said metal by effecting intimate contact between elemental chlorine and a fluidized bed of said ore in finely divided form having added thereto about 1 to 10 percent by weight of a metal sulfide selected from the group consisting of iron, cobalt, and nickel sulfides, said chlorine and said ore being contacted in a ratio of about 5.5 to 20 pounds of chlorine per 100 pounds of ore, said contacting being effected at a temperature in the range of about 315° C. to 400° C. that is effective to form said vaporous chloride but insufficient to chlorinate a substantial proportion of the gangue materials, removing vaporous constituents from the reaction mixture, and recovering the high melting metal chloride therefrom.

6. An extractive metallurgical process for recovering columbium in chloride form from pyrochlore ores and concentrates thereof containing the same and that contains predominant proportions of gangue materials, comprising forming vaporous columbium pentachloride by effecting intimate contact between elemental chlorine and a fluidized bed of finely divided material selected from the group consisting of columbium pyrochlore ore and concentrates therof, and having added thereto about 2 to 6 percent by weight of iron pyrite, said chlorine and said ore being contacted in a ratio of about 5.5 to 20 pounds of chlorine per 100 pounds of ore, at a temperature in the range of about 315° C. to 400° C. and effective to form vaporous columbium pentachloride but insufficient to chlorinate a substantial proportion of the gangue materials, removing vaporous constituents from the reaction mixture and recovering columbium pentachloride therefrom.

7. An extractive metallurgical process for recovering in chloride form a high melting metal selected from the group consisting of columbium, tantalum, titanium, vanandium, chromium, zirconium, molybdenum, tungsten and antimony, and that forms a low boiling chloride from an ore containing such metal that is nonrefractory to chlorination and that contains a predominant proportion of gangue materials, comprising activating said ore for chlorination by intimately contacting the ore in finely divided form with oxygen at an elevated temperature in the range of about 200° C. to 500° C., and forming a vaporous chloride of said metal by effecting itnimate contact between elemental chlorine and a fluidized bed of the activated ore in finely divided form having added thereto about 1 to 10 percent by weight of a sulfide of a metal selected from the group consisting of iron, cobalt, nickel, tin and lead, that has a variable valence and that is capable of forming a chloride that is non-volatile at the conditions of the reaction, said chlorine and said ore being contacted in a ratio of about 5.5 to 20 pounds of chlorine per 100 pounds of ore, said contacting being effected at a temperature in the range of about 315° C. to 400° C. that is effective to form the vaporous chloride of said high melting metal but insufficient to chlorinate a substantial proportion of the gangue materials, removing vaporous constituents from the reaction mixture, and recovering the high melting chloride therefrom.

8. The process of claim 7 where said high melting metal is columbium.

9. The process of claim 7 where said sulfide is an iron sulfide.

10. The process of claim 7 where said sulfide is iron pyrite.

References Cited by the Examiner

UNITED STATES PATENTS

| | | | |
|---|---|---|---|
| 1,415,028 | 5/1922 | Gildemeister | 23—17 |
| 1,979,280 | 11/1934 | Mitchell | 23—87 X |
| 1,994,367 | 3/1935 | Millar | 23—87 X |
| 2,030,867 | 2/1936 | Hart | 23—87 X |
| 2,723,902 | 11/1955 | Reeve et al. | 23—87 |
| 2,797,155 | 6/1957 | Vaughan | 23—87 X |
| 2,870,073 | 1/1959 | Merlub-Sobel et al. | 23—87 X |
| 2,882,211 | 4/1959 | Autrey | 23—87 X |
| 3,011,866 | 12/1961 | Gibson | 23—17 |

FOREIGN PATENTS 773,535  4/1957  Great Britain.

MAURICE A. BRINDISI, *Primary Examiner.*

GEORGE D. MITCHELL, *Examiner.*